United States Patent [19]

Funke

[11] Patent Number: 4,850,045
[45] Date of Patent: Jul. 18, 1989

[54] METHOD AND APPARATUS FOR TESTING FIBER OPTIC HUBS

[75] Inventor: Klaus E. Funke, San Rafael, Calif.

[73] Assignee: AMP Incorporated, Harrisburg, Pa.

[21] Appl. No.: 115,669

[22] Filed: Nov. 2, 1987

[51] Int. Cl.$^4$ ............................................... H04B 9/00
[52] U.S. Cl. .................................... 455/607; 455/612; 455/617; 370/1
[58] Field of Search ............... 455/600, 601, 606, 607, 455/612, 617, 618, 619; 370/1, 4, 3

[56] References Cited

U.S. PATENT DOCUMENTS

| | | | |
|---|---|---|---|
| 4,641,375 | 2/1987 | Dean | 455/607 |
| 4,723,309 | 2/1988 | Mochizuki et al. | 455/607 |
| 4,723,311 | 2/1988 | Moustakas et al. | 455/607 |
| 4,751,701 | 6/1988 | Roos et al. | 455/601 |

FOREIGN PATENT DOCUMENTS 0019005  2/1977  Japan ................................ 455/606

OTHER PUBLICATIONS

Optimate Optical Lightpath Continuity Checker, Copyright 1987, AMP Incorporated.
EPO Standard Search Report.
EPO Standard Search Report Annex.
Article entitled "A View of the Emerging Phototonic Network", by C. A. Brackett.

*Primary Examiner*—Robert L. Griffin
*Assistant Examiner*—L. Van Beek
*Attorney, Agent, or Firm*—David L. Smith

[57] ABSTRACT

A fiber optic hub (10) for local area networks (15, 35) and other data communication systems including an internal self-diagnostic and cable test capability for permitting off-line testing of the hub (10) and of fiber optic cables connected to the hub (10). The hub (10) includes a plurality of optical interfaces (30a–30p) each having an optical receiver section (36) and an optical transmitter section (37) and hub-processing circuitry (32) connected to the optical interfaces (30a–30p) for processing data signals received by the optical receiver sections (36) and for providing the processed data signals to the transmitter sections (37) to be transmitted back through the network (15, 35) thereby. Hub (10) further includes a test signal source (61) for generating a test signal to be transmitted from the transmitter sections (36) of one or all of the optical interfaces (30a–30p), and a test signal detector (80) connected to the receiver sections (37) of the interfaces (30a–30p) for detecting a test signal received by any of the receiver sections (37) and for generating an error indicator signal when the received test signal differs from the transmitted test signal. The transmitter and receiver sections (36, 37) of any hub optical interface (30a–30p) can be conveniently tested by looping a fiber optic cable from a transmitter section (37) of any optical interface (30a–30p) to the receiver section (37) of any other optical interface (30a–30p) and monitoring an error indicator (LED) (80) illuminated by the error indicator signal. The hub (10) also provides a convenient means for testing fiber optic cable connected to the hub (10).

14 Claims, 4 Drawing Sheets

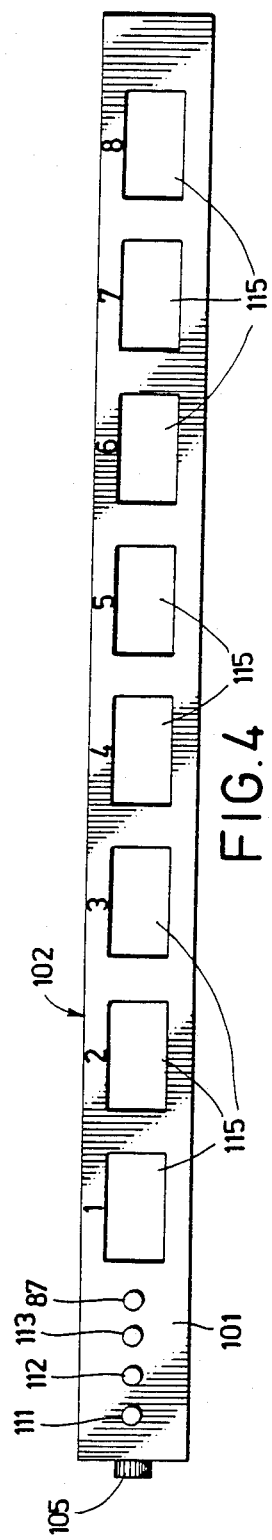

METHOD AND APPARATUS FOR TESTING FIBER OPTIC HUBS

BACKGROUND OF THE INVENTION

The present invention relates generally to hubs for fiber optic data communication networks and, more particularly, to a fiber optic hub having an off-line self-diagnostic and cable test capability and to a method for testing fiber optic hubs.

Fiber optic cable possesses a number of important advantages over coaxial electrical cable and other hardwire data transmission mediums which make it desirable for use in local area networks and other data communication systems. For example, fiber optic cable is immune to electromagnetic noise and other types of interference that often affect hardwire systems. Also, because fiber optic cable carries no electricity, fiber optic systems are often more reliable and insensitive to cable damage than hardwire systems. In addition, unlike the signal on a hardwire cable, the signal on a fiber optic cable normally cannot be tapped off or diverted without the interception being noticed, thus providing fiber optic systems with a greater degree of security.

A local area network (LAN) functions to interconnect a plurality of personal computers or other electronic devices such that the various devices can communicate with one another over the network. A typical fiber optic LAN includes a plurality of remote optical interfaces which interface a plurality of remote "nodes" to one or more fiber optic hubs. Each remote node may include, for example, a personal computer (PC) interfaced with a LAN controller; and each hub includes a plurality of hub optical interfaces connected to appropriate hub LAN processing circuitry. Each remote optical interface and each hub optical interface includes an optical receiver section and an optical transmitter section; and as known to those skilled in the art, data from a remote node is transmitted by the transmitter section of its associated remote optical interface to the receiver section of a corresponding hub optical interface over a length of fiber optic cable, processed by the hub LAN circuitry, and then retransmitted over the network by the transmitter sections of the hub optical interfaces.

An important inadequacy of many known fiber optic hubs is that they are not capable of being easily tested for proper operation without being first installed into a data communication network and connected to personal computers or other external devices via the network. Testing of the hub at this level is not fully satisfactory because it requires that the technician be capable of operating computer terminals or other external devices and, in many cases, renders defects in the hub more difficult to identify.

The testing of fiber optic hubs with integral test functions leads to more efficient manufacturing techniques providing the flexibility of permitting a variety of different types of tests to be performed.

SUMMARY OF THE INVENTION

The present invention provides a fiber optic hub for local area networks and other data communication systems which include an internal self-diagnostic and cable test capability to permit effective off-line testing of the hub and of fiber optic cable connected to the hub without it being necessary to incorporate the hub into a data communication network.

A fiber optic hub according to the invention comprises a plurality of optical interfaces, each optical interface including an optical receiver section and an optical transmitter section; and hub-processing circuitry electrically connected to the plurality of optical interfaces for processing data signals received by an optical receiver section and for providing processed data signals to the transmitter sections to be transmitted thereby; the improvement comprising wherein said hub further includes a test signal source for generating a test signal to be transmitted from the transmitter section of at least one optical interface; and a test signal detector for detecting a transmitted test signal received by the receiver section of an optical interface, the test signal detector including means for detecting when the received test signal differs from the transmitted test signal.

In accordance with a presently preferred embodiment of the invention, the test signal source generates a test signal which comprises a continuous stream of pulses; and the test signal detector monitors the received test signal and includes means for detecting the occurrence of a missed pulse in the received test signal indicating a defect in the optical interface being tested. The test signal detector further includes means for illuminating an error indicator LED on the hub housing for notifying the technician when a defect has been detected.

Preferably, the test signal is derived from a jamming signal generator which is normally incorporated into the hub-processing circuitry to generate a jamming signal if data signals are received by two or more hub optical interfaces simultaneously.

In accordance with the present invention, the hub includes a first test mode in which the test signal is transmitted by the transmitter section of each optical interface, and a second test mode in which the test signal is transmitted from the transmitter section of only a single optical interface, the selected test mode depending on the nature of the test to be conducted. To test the transmitter and receiver sections of the hub optical interfaces, for example, the hub is operated in the first test mode such that the test signal is transmitted from the transmitter section of each optical interface. A fiber optic cable is looped back from the transmitter section of any interface to the receiver section of any other interface. Any defect in an interface results in the error indicator LED being energized.

In accordance with a further aspect of the invention, the fiber optic hub can be used to sort out pre-installed cables, to check connector polarity of pre-installed cables, and to evaluate the loss limitation of connectorized fiber optic cable.

The fiber optic hub of the invention can also be used to test an upper tier hub response initiated by a lower tier hub in a two-tier network.

Further advantages and specific details of the invention will become apparent hereinafter in conjunction with the following detailed description of a presently preferred embodiment.

BRIEF DESCRIPTION OF THE DRAWINGS

FIG. 4 illustrates the front panel of the housing of the fiber optic hub of the present invention.

DETAILED DESCRIPTION OF THE PREFERRED EMBODIMENT

Figure 1:
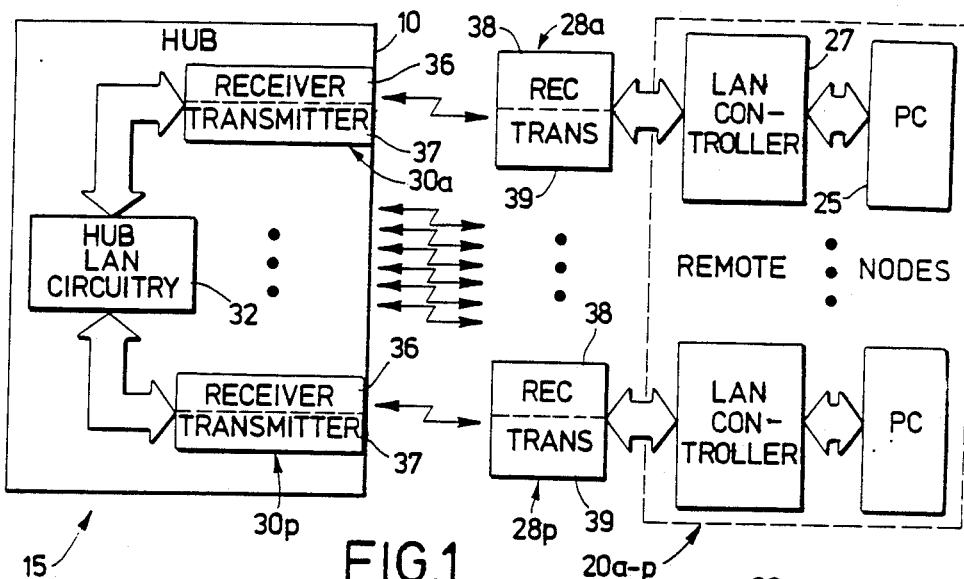
FIGS. 1 and 2 are block diagrams schematically illustrating single-tier and two-tier fiber optic local area networks, respectively, to assist in understanding the present invention.

FIG. 1 schematically illustrates a one-tier fiber optic local area network incorporating a fiber optic hub having internal test capacity according to a presently preferred embodiment of the invention. The local area network (LAN) is generally designated by reference numeral 15 and includes a plurality of remote optical interfaces 18a-28p which are adapted to interface sixteen remote nodes 20a-20p to a fiber optic hub 10 via fiber optic cables (not shown) connecting the remote interfaces to the hub. Each remote node may comprise, for example, a conventional personal computer (PC) 25 such as an IBM Personal Computer interfaced with a local area network controller 27 such as an Intel 82588 LAN Controller.

Hub 10 contains sixteen optical interfaces 30a-30p which correspond to the remote optical interfaces 28a-28p, and suitable LAN processing circuitry 32 electrically connected bidirectionally to each hub optical interface 30a-30p.

Each hub optical interface 30a-30p includes an optical receiver section 36 and an optical transmitter section 37. Similarly, each remote optical interface includes an optical receiver section 38 and an optical transmitter section 39. Data signals transmitted from any node via transmitter section 39 of its associated optical interface is received by receiver section 36 of the corresponding hub optical interface and provided to hub LAN processing circuitry 32. Hub LAN processing circuitry 32 includes pulse regenerator or repeater circuits that echo the data signals received from the node through the transmitter sections of the remaining hub optical interfaces to all the other nodes in the network as is known to those skilled in the art.

The optical receiver sections and the optical transmitter sections of hub optical interfaces 30a-30p and hub LAN processing circuitry 32 may be of generally conventional design and, thus, are not described in detail herein. Basically, the optical receiver section of each hub optical interface includes a suitable light-sensitive receiver which receives the optical signal transmitted from the transmitter section of its corresponding remote optical interface, and appropriate circuitry which produces corresponding electrical signals to be transmitted to the hub LAN processing circuitry. The optical transmitter section of each hub optical interface includes circuitry which receives digital data from the hub LAN processing circuitry and which drives a light-emitting diode to produce digitally encoded optical signals for transmission over fiber optic cables to the receiver sections of remote optical interfaces of the other nodes in the network. The circuitry of a suitable hub optical interface (and of a suitable remote optical interface) is described in detail in commonly assigned, copending U.S. patent application Ser. No. 931,578 filed Nov. 17, 1986, entitled "Optical Interface", which application is hereby incorporated by reference.

Figure 2:
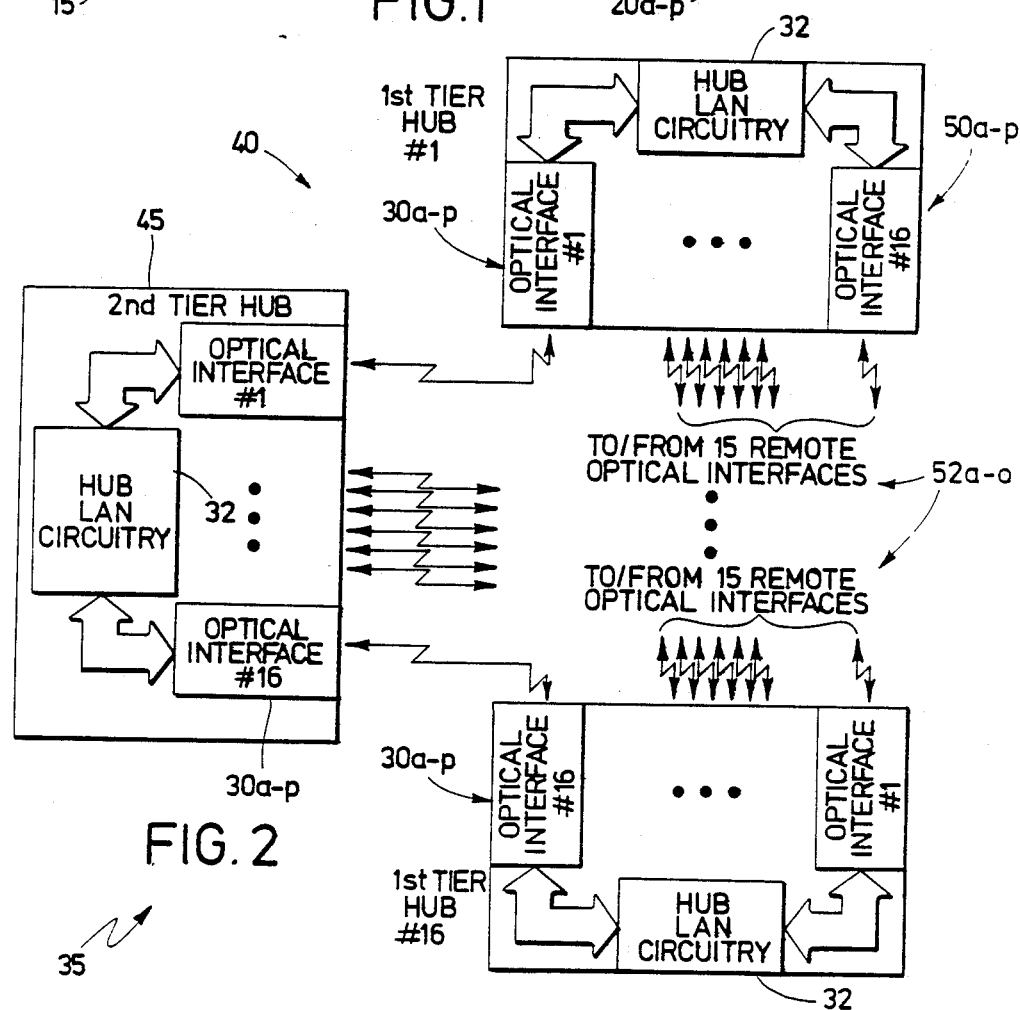

FIG. 2 schematically illustrates a two-tier fiber optic local area network generally designated by reference numeral 35. Two-tier LAN 35 comprises a second tier fiber optic hub 45 and sixteen first tier fiber optic hubs 50a-50p. Each first tier hub 50a-50p includes sixteen optical interfaces 30a-30p identical to those illustrated in FIG. 1, and conventional hub LAN processing circuitry 32 identical with that illustrated in FIG. 1 and electrically connected bidirectionally to the hub optical interfaces 30a-30p. Fifteen optical interfaces of each first tier hub 50a-50p interface with fifteen corresponding remote optical interfaces 52a-52p. One optical interface of each first tier hub 50a-50p provides a dedicated interface with a corresponding optical interface of second tier hub 45.

Second tier hub 45 includes sixteen optical interfaces 30a-30p identical to those in first tier hubs 50a-50p. Each second tier hub optical interface 30a-30p interfaces one first tier hub 50a-50p to second tier hub 45 through the corresponding dedicated optical interfaces of first tier hubs 50a-50p. Second tier hub 45 also includes conventional hub LAN processing circuitry 32 identical to that illustrated in FIG. 1.

It will be appreciated that two-tier LAN 35 of FIG. 2 permits up to 240 remote nodes to be linked together. It should also be appreciated that an even greater number of nodes may be linked by increasing the number of tiers of the LAN or by providing hubs having a greater number of optical interfaces and that the present invention should not be limited to any particular LAN arrangement of hub capacity.

As is known to those skilled in the art, hub LAN processing circuitry 32 typically includes a collision detector for detecting if signals are received through more than one hub optical interface simultaneously, and a jamming signal generator that generates a jamming signal which is transmitted to each node when, and only when, a collision is detected. In accordance with the present invention, the jamming signal generator normally incorporated into hub LAN circuitry 32 is used to derive a test signal which, when the hub is operated in a test mode, provides an effective means for testing the transmitter and receiver sections of the hub optical interfaces and for testing pre-installed optical cable and cable connectors without it being necessary to incorporate the hub into a data communications network.

Figure 3A:
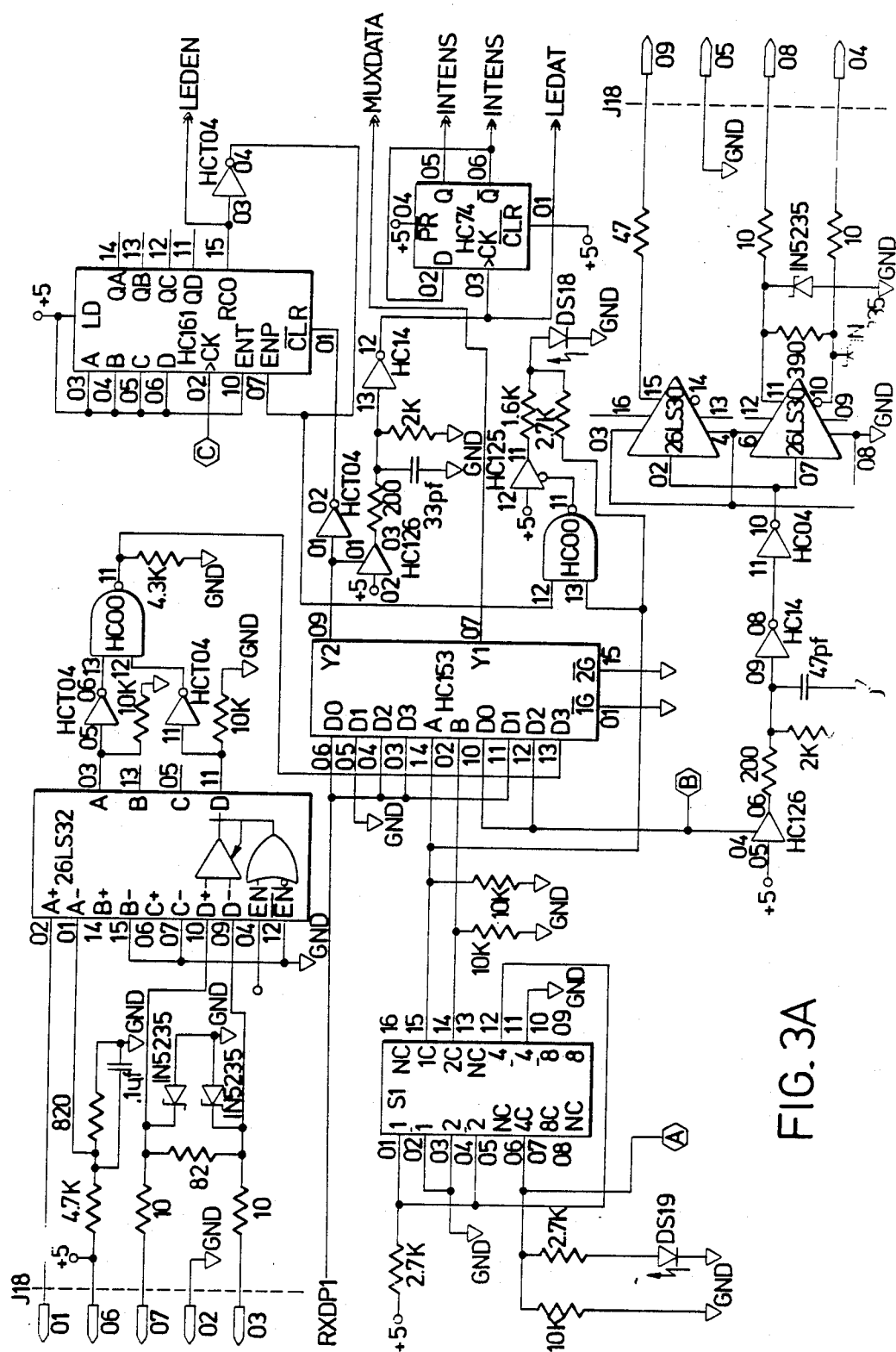
FIGS. 3A and 3B together comprise an electrical schematic diagram illustrating the details of the test signal source and the test signal detector circuitry of a fiber optic hub according to a presently preferred embodiment of the invention.
Figure 3B:
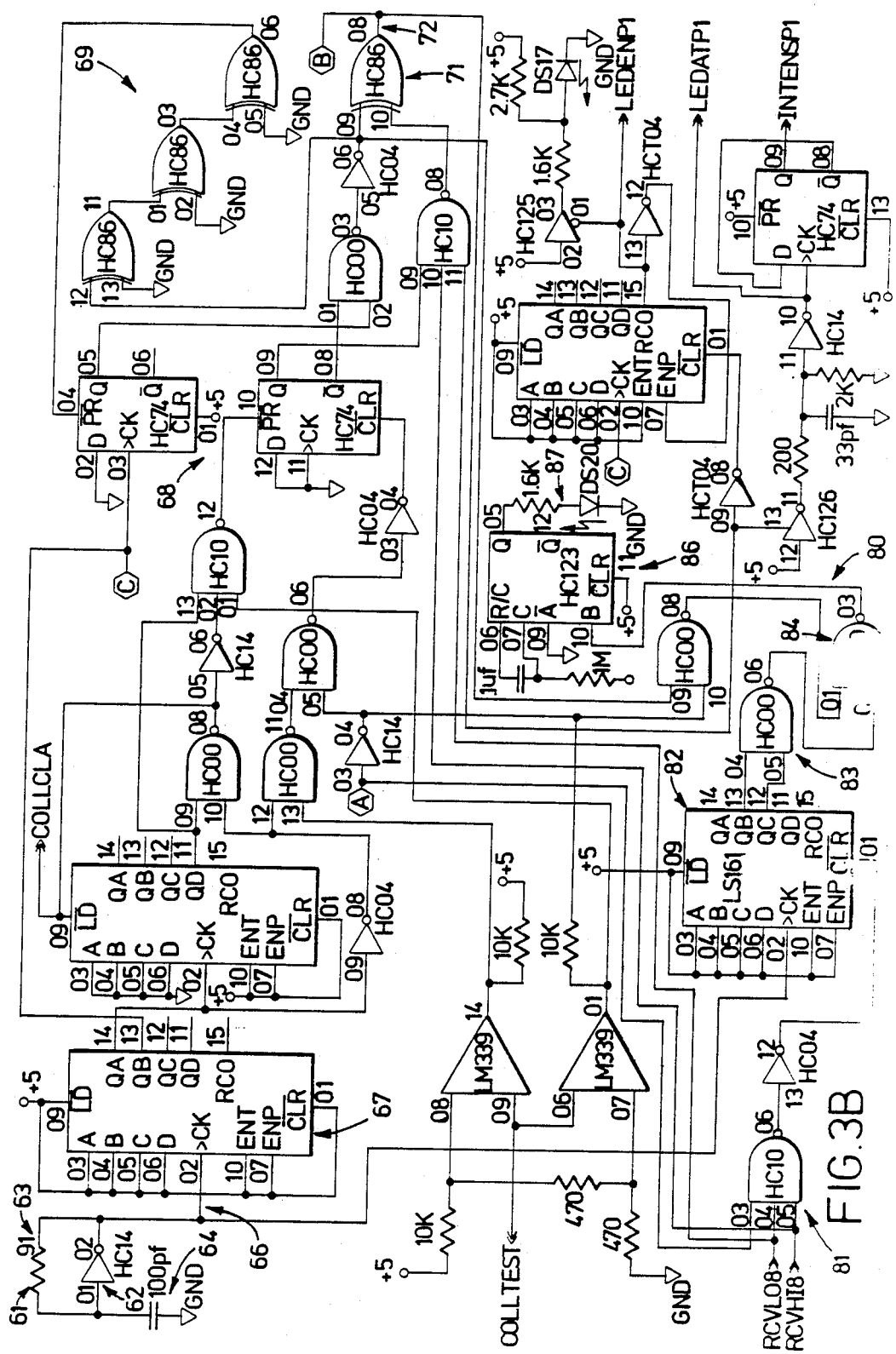

FIG. 3B illustrates an oscillator 61 normally incorporated in conventional hub LAN processing circuitry for use in generating a jamming signal when a collision is detected by a collision detector in the circuitry. Oscillator 61 is formed by gate 62, resistor 63, and capacitor 64 and generates a 6 MHz signal on a line 66. The signal on line 66 is divided to 1.5 MHz by counter 67 and then delivered to flip-flop 68. Flip-flop 68 together with the delay line formed by gates 69 generates a 130 ns wide pulse for every positive transition of the clock signal. These pulses comprise a continuous stream of pulses and are inserted into the path of the data that is normally received and processed by hub LAN processing circuitry 32 at gate 71 pins 9 and 10. The output of gate 71 on line 72 thus comprises a continuous stream of pulses which are transmitted to the LED drivers of the transmitter sections of the hub optical interfaces which are described in detail in the above-referenced U.S. patent application Ser. No. 931,578.

As shown in FIG. 4, the hub is carried within a housing 102 having a switch 105 which can be set to a plurality of hub-operating positions including a first test mode in which the test signal is simultaneously transmitted from each of the hub interfaces 30a-30p, and a second test mode in which the test signal is transmitted from only one predetermined hub interface depending on the nature of the test to be performed. In a test mode, the output of the transmitter section of a hub optical interface comprises a continuous bit stream which can be optically transmitted over a fiber optic cable connected to the interface.

FIG. 3B also illustrates the test signal detector circuitry which has been incorporated into hub 10 of the present invention. The detector circuitry is generally designated by reference numeral 80; and when the hub is operating in a test mode, all incoming data from the receiver section of a hub optical interface is passed through gate 81 pins 4 and 5 to clear counter 82. Counter 82 is clocked by oscillator 61 which is used to generate the test signal. Counter 82 and a gate 83 together form a missing pulse detector for a signal received by a receiver section of a hub optical interface. A missed pulse in a received signal allows counter 82 to advance by five counts which advance is detected at gate 84 and results in a trigger pulse for one shot 86. The trigger pulse illuminates an error indicator LED 87 on front panel 101 of hub housing 102 (FIG. 4) for approximately 100 ms to indicate the presence of a missed pulse and, hence, to notify a technician of a defect in the circuitry of the optical interface of the hub being tested.

With the present invention, a plurality of tests can be efficiently performed off line without it being necessary to incorporate the hub into a complete data communication network. For example, to test a transmitter or receiver section of a hub optical interface, hub mode switch 105 is moved to the first test mode position such that a test signal is transmitted from the transmitting section of each hub optical interface 30a–30p. Initially, the transmit LEDs of the transmitter sections of each hub optical interface are observed to ensure that they are on. Thereafter, the test signal from any of the optical interfaces is looped back to the receiving section of any other of the optical interfaces, using a fiber optic cable of known quality and with acceptable loss. Error indicator LED 87 is then simply observed to see if it is illuminated. If LED 87 is illuminated, a missed pulse in the received test signal and a problem in the optical interface being tested are indicated. By sequentially looping the transmitted test signal back from the transmitter section of one optical interface to the receiver section of another optical interface, each optical interface can be easily tested in turn.

With the hub of the present invention, pre-installed fiber optic cable can also conveniently be tested. For example, to sort out pre-installed fiber optic cables, mode selector switch 105 is moved to the second test mode position whereby the test signal is transmitted from only a single optical interface. By sequentially attaching one end of each pre-installed cable to the optical interface and observing the other end of the cables to see which one is illuminated, it becomes a simple matter to sort out the various cables.

To check connector polarity of pre-installed fiber optic cables, switch 105 is moved to the first test mode position in which a test signal is transmitted from all optical interfaces. The proper fiber optic connector installation can then be visually verified at the user location.

The present invention also permits top tier hub response initiated by a lower tier hub to be tested in a two-tier system, such as is illustrated in FIG. 2. To perform this test, hub mode select switch 105 is moved to the second test mode position wherein a test pattern is transmitted from a single optical interface (the single optical interface being the dedicated optical interface used to connect the lower tier hub to the upper tier hub). Provided that there is a cable connection between the transmitting optical interface of the hub and the dedicated optical interface of an operational upper tier hub, it is first observed that all the transmit LEDs of the remaining optical interfaces of the upper tier hub are on. Thereafter, the transmitted signal is looped back between any of the free optical interfaces of the upper tier hub using a fiber optic cable of known quality and acceptable loss to test each optical interface of the upper tier hub.

FIG. 4 illustrates the front panel 101 of housing 102 of hub 10. As shown, the front panel includes eight ports 115 for connecting eight hub optical interfaces to remote nodes. Eight additional ports are also provided on the back panel of the housing. The front panel also contains four LEDs 111, 112, 113, and 87 for indicating different hub-operating modes. when operating in the first test mode, LEDs 111 and 113 are continuously illuminated; and LED 87 is illuminated only when a missed pulse is detected in the received test signal. When operating in the second test mode, LEDs 111, 112, and 113 are always illuminated; and LED 87 is illuminated only when a missed pulse is detected in the test signal. In this way, a technician is always fully apprised of the mode in which the hub is operating and of the results of a test being performed.

While what has been described constitutes a presently preferred embodiment of the invention, it should be recognized that the invention could take numerous other forms. Accordingly, it should be understood that the invention should be limited only insofar as it is required by the scope of the following claims.

I claim:

1. A fiber optic hub which is adapted to be incorporated into a data communication network which includes a plurality of remote optical interfaces adapted to interface a plurality of remote nodes to said fiber optic hub, said fiber optic hub comprising:

a plurality of hub optical interfaces, each of said plurality of hub optical interfaces including an optical receiver section and an optical transmitter section; and hub-processing circuitry electrically connected to said plurality of hub optical interfaces for processing data signals received by the optical receiver section of one of said plurality of hub optical interfaces and for providing processed data signals to the transmitter sections of said plurality of hub optical interfaces to be transmitted thereby; the improvement comprising wherein said hub further includes a test signal source for generating a test signal to be transmitted from the transmitter section of at least one of said plurality of hub optical interfaces; and a test signal detector for detecting the transmitted test signal received by the receiver section of any of said plurality of hub optical interfaces, said test signal detector including means for detecting when said received test signal differs from said transmitted test signal and for generating an error signal when said received test signal differs from said transmitted test signal.

2. The fiber optic hub of claim 1 wherein said test signal source comprises means for generating a continuous stream of pulses and wherein said test signal detector comprises means for detecting said received continuous stream of pulses and for generating an error indicator signal if a missed pulse is detected.

3. The fiber optic hub of claim 1 wherein said hub includes means for operating said hub in a first test mode for simultaneously transmitting said test signal from the transmitter section of each of said plurality of hub optical interfaces, and in a second test mode for transmitting said test signal from the transmitter section of only one of said plurality of hub optical interfaces.

4. The fiber optic hub of claim 1 wherein said hub further includes an error indicator responsive to said error signal for indicating when said received test signal differs from said transmitted test signal.

5. The fiber optic hub of claim 4 wherein said error indicator is on a housing for said hub.

6. A fiber optic hub for local area networks comprising a plurality of optical interfaces, each of said plurality of optical interfaces including an optical receiver section and an optical transmitter section; and hub-processing circuitry connected to said plurality of optical interfaces for processing data signals received by an optical-receiver section of one of said plurality of optical interfaces and for providing the processed data signals to the optical transmitter sections of the plurality of optical interfaces to be transmitted thereby, said hub-processing circuitry further including a jamming signal generator for generating a jamming signal if data signals are received by the optical receiver section of more than one optical interface simultaneously; the improvement comprising a test signal source for generating a test signal to be transmitted from the optical transmitter section of at least one of said plurality of optical interfaces, said test signal source being connected to said jamming signal generator for generating a test signal derived from said jamming signal; a test signal detector connected to the optical receiver section of each of said plurality of optical interfaces for detecting a transmitted test signal received by the receiver section of any of said plurality of optical interfaces and for generating an error indicator signal when said received test signal differs from said transmitted test signal; and an error indicator responsive to said error indicator signal for indicating when the received test signal differs from the transmitted test signal.

7. The fiber optic hub of claim 6 wherein said error indicator comprises an error indicator LED on a housing for said hub.

8. The fiber optic hub of claim 6 wherein said test signal comprises a continuous stream of pulses and wherein said test signal detector includes means for detecting a missing pulse in said received test signal and for generating said error indicator signal when a missing pulse is detected.

9. In a fiber optic hub which is adapted to be incorporated into a data communication network which includes a plurality of remote optical interfaces adapted to interface a plurality of remote nodes to said fiber optic hub, said fiber optic hub having a plurality of hub optical interfaces, each of which includes a transmitter section and a receiver section, and hub-processing circuitry coupled to said plurality of hub optical interfaces for processing data signals received by the receiver section of one of said plurality of hub optical interfaces and for providing the processed data signals to the transmitter section of said plurality of hub optical interfaces to be transmitted thereby; a method for testing said fiber optic hub off-line from said data communication network, said method comprising providing a test signal to be transmitted from the transmitter section of at least one of said hub optical interfaces; connecting a fiber optic cable from the transmitter section of one of said at least one hub optical interface to the receiver section of one of said hub optical interfaces to be tested; detecting the test signal received by the receiver section of the hub optical interface to be tested; and generating an error indicator signal when said received test signal differs from said transmitted test signal indicating a defect in said optical interface to be tested.

10. The method of claim 9 wherein said step of providing a test signal comprises providing a test signal that is simultaneously transmitted from the transmitter sections of each of said plurality of hub optical interfaces.

11. The method of claim 10 wherein said connecting step comprises sequentially connecting a fiber optic cable from the transmitter section of one of said hub optical interfaces to the receiver section of the other of said hub optical interfaces for testing each of said hub optical interfaces.

12. A fiber optic hub for data communication networks comprising:
a plurality of optical interfaces, each of said plurality of optical interfaces including an optical receiver section and an optical transmitter section; and hub-processing circuitry electrically connected to said plurality of optical interfaces for processing data signals received by the optical receiver section of one of said plurality of optical interfaces and for providing processed data signals to the transmitter sections of said plurality of optical interfaces to be transmitted thereby; the improvement comprising wherein said hub further includes a test signal source for generating a test signal comprising a continuous stream of pulses to be transmitted from the transmitter section of at least one of said plurality of optical interfaces; a test signal detector for detecting the transmitted test signal received by the receiver section of any of said plurality of optical interfaces, said test signal detector including means for detecting said received continuous stream of pulses and for generating an error indicator signal if a missed pulse is detected in said received continuous stream of pulses; and an error indicator LED illuminated by said error indicator signal when a missed pulse is detected by said test signal detector.

13. A fiber optic hub for data communication networks comprising:
a plurality of optical interfaces, each of said plurality of optical interfaces including an optical receiver section and an optical transmitter section; hub-processing circuitry electrically connected to said plurality of optical interfaces for processing data signals received by the optical receiver section of one of said plurality of optical interfaces and for providing processed data signals to the transmitter sections of said plurality of optical interfaces to be transmitted thereby; and a jamming signal generator for generating a jamming signal when data signals are received by the receiving sections of more than one of said plurality of hub optical interfaces simultaneously; the improvement comprising wherein said hub further includes a test signal source for generating a test signal to be transmitted from the transmitter section of at least one of said plurality of optical interfaces, said test signal source including means coupled to said jamming signal generator for deriving said test signal from the jamming signal generated by said jamming signal generator; and a test signal detector for detecting the transmitted test signal received by the receiver section of any of said optical interfaces, said test signal detector including means for detecting when said received test signal differs from said transmitted test signal.

14. A method for testing a fiber optic hub, said hub having a plurality of optical interfaces, each of which includes a transmitter section and a receiving section, and hub-processing circuitry coupled to said plurality of optical interfaces for processing data signals received by the optical receiver section of one of said plurality of optical interfaces and for providing the processed data signals to the transmitter section of the plurality of hub optical interfaces to be transmitted thereby; said method comprising deriving a test signal from a jamming signal normally generated by a jamming signal generator in said hub-processing circuitry, transmitting said test signal from the optical transmitter section of at least one of said optical interfaces; connecting a fiber optic cable from the transmitter section of one of said at least one optical interfaces to the receiver section of one of said optical interfaces being tested; detecting the test signal received by the receiver section of said optical interface being tested; and generating an error indicator signal when said received test signal differs from said transmitted test signal indicating a defect in said optical interface being tested.

* * * * *